(12) United States Patent
Sahr

(10) Patent No.: US 6,427,552 B1
(45) Date of Patent: Aug. 6, 2002

(54) RACK AND PINION STEERING GEAR WITH SPRING AND RELIEF POCKET

(75) Inventor: Paul R. Sahr, Lake Orion, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/693,670

(22) Filed: Oct. 20, 2000

(51) Int. Cl.[7] .............................. B62D 3/12; F16H 1/12
(52) U.S. Cl. ........................ 74/422; 74/498; 180/427; 267/158; 267/160; 267/164; 384/10; 384/37
(58) Field of Search .................. 74/422, 498; 180/427, 180/428; 267/158, 160, 164; 384/10, 37

(56) References Cited

U.S. PATENT DOCUMENTS

| | | | |
|---|---|---|---|
| 4,016,774 A | * 4/1977 | Baker et al. | ................ 74/424.6 |
| 4,218,933 A | 8/1980 | Allen et al. | ..................... 74/422 |
| 4,222,282 A | * 9/1980 | Taig | ............... 74/457 |
| 4,271,716 A | * 6/1981 | Carduner | ..................... 74/422 |
| 5,216,928 A | 6/1993 | Kodachi | ....................... 74/422 |

FOREIGN PATENT DOCUMENTS

| | | | |
|---|---|---|---|
| DE | 2934275 A1 | * | 3/1980 |
| EP | 805094 A2 | * | 11/1997 |

* cited by examiner

*Primary Examiner*—Allan D. Herrmann
(74) *Attorney, Agent, or Firm*—Tarolli, Sundheim, Covell, Tummino & Szabo L.L.P.

(57) ABSTRACT

A rack and pinion steering gear (10). The rack and pinion steering gear (10) comprises a housing (12) having a chamber (18). A portion of the chamber (18) is a relief pocket (22). A pinion gear (26) is rotatably mounted in the chamber (18) of the housing (12). A rack bar (38) is movable relative to the pinion gear (26). The rack bar (38) is at least partially disposed in the chamber (18) of the housing (12) and has teeth (44) in meshing engagement with the pinion gear (26). A spring (60) is disposed in the chamber (18) of the housing (12) for supporting and guiding movement of the rack bar (38) relative to the pinion gear (26). The spring (60) extends across an opening to the relief pocket (22). The spring (60) extends into the relief pocket (22) as a load applied to the spring (60) from the rack bar (38) increases.

5 Claims, 3 Drawing Sheets

RACK AND PINION STEERING GEAR WITH SPRING AND RELIEF POCKET

TECHNICAL FIELD

The present invention relates to a rack and pinion steering gear and, more particularly, to a rack and pinion steering gear having a spring for supporting and guiding a rack bar.

BACKGROUND OF THE INVENTION

A known rack and pinion steering gear includes a pinion gear that is rotatably mounted in a housing and is connected with a steering wheel of a vehicle. A rack bar extends through the housing and has opposite end portions connected with steerable vehicle wheels. Gear teeth formed on the rack bar are disposed in meshing engagement with gear teeth formed on the pinion gear. A yoke assembly is disposed in the housing to support and guide movement of the rack bar relative to the housing. The yoke assembly has a yoke with an arcuate surface, which is biased toward the rack bar. The yoke assembly helps to ensure proper lash between the teeth of the rack bar and the teeth of the pinion gear.

In another known rack and pinion steering system, the yoke assembly is replaced by a bushing mounted in a bushing sleeve. The bushing surrounds the rack bar and supports the rack bar to maintain engagement of the teeth of the rack bar with the teeth of the pinion gear.

SUMMARY OF THE INVENTION

The present invention is directed to a rack and pinion steering gear. The rack and pinion steering gear comprises a housing having a chamber. A portion of the chamber is a relief pocket. A pinion gear is rotatably mounted in the chamber of the housing. A rack bar is movable relative to the pinion gear. The rack bar is at least partially disposed in the chamber of the housing and has teeth in meshing engagement with the pinion gear. A spring is disposed in the chamber of the housing for supporting and guiding movement of the rack bar relative to the pinion gear. The spring extends across an opening to the relief pocket. The spring extends into the relief pocket as a load applied to the spring from the rack bar increases.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

Figure 1:
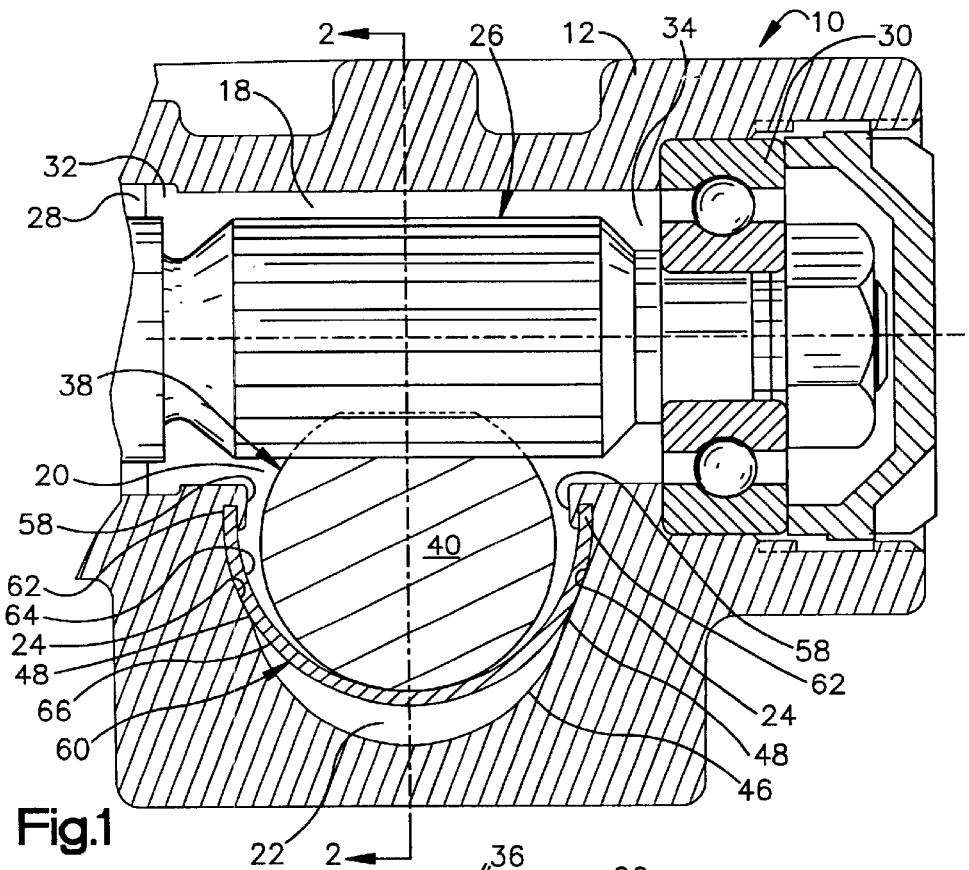
FIG. 1 is a sectional view of a rack and pinion steering gear constructed in accordance with the present invention.

A sectional view of the rack and pinion steering gear 10 of the present invention is illustrated in FIG. 1. The rack and pinion steering gear 10 includes a housing 12. Preferably, the housing 12 is made from cast metal. The housing 12 extends longitudinally and includes a first end 14, a second end 16 and a chamber 18. The chamber 18 includes a main channel 20 and a relief pocket 22 that extends off of the main channel 20. Preferably, the main channel 20 has an arcuate bottom surface 24 (shown by dotted lines in FIG. 2).

A pinion gear 26 is located in the main channel 20 of the housing 12. Two bearing assemblies 28 and 30 rotatably support the pinion gear 26 in the housing 12. The first bearing assembly 28 is located in a first lateral extension 32 of the main channel 20 of the chamber 18 of the housing 12. A second bearing assembly 30 is located in a second lateral extension 34 of the main channel 20 of the chamber 18 of the housing 12. The second lateral extension 34 is located on an opposite end of the pinion gear 26 from the first lateral extension 32.

The pinion gear 26 is connected with the vehicle steering wheel (not shown). Rotation of the vehicle steering wheel causes rotation of the pinion gear 26. A plurality of teeth 36 extends around the outer circumference of the pinion gear 26. The teeth 36 are shown as spur gear teeth but could be helical teeth.

Figure 2:
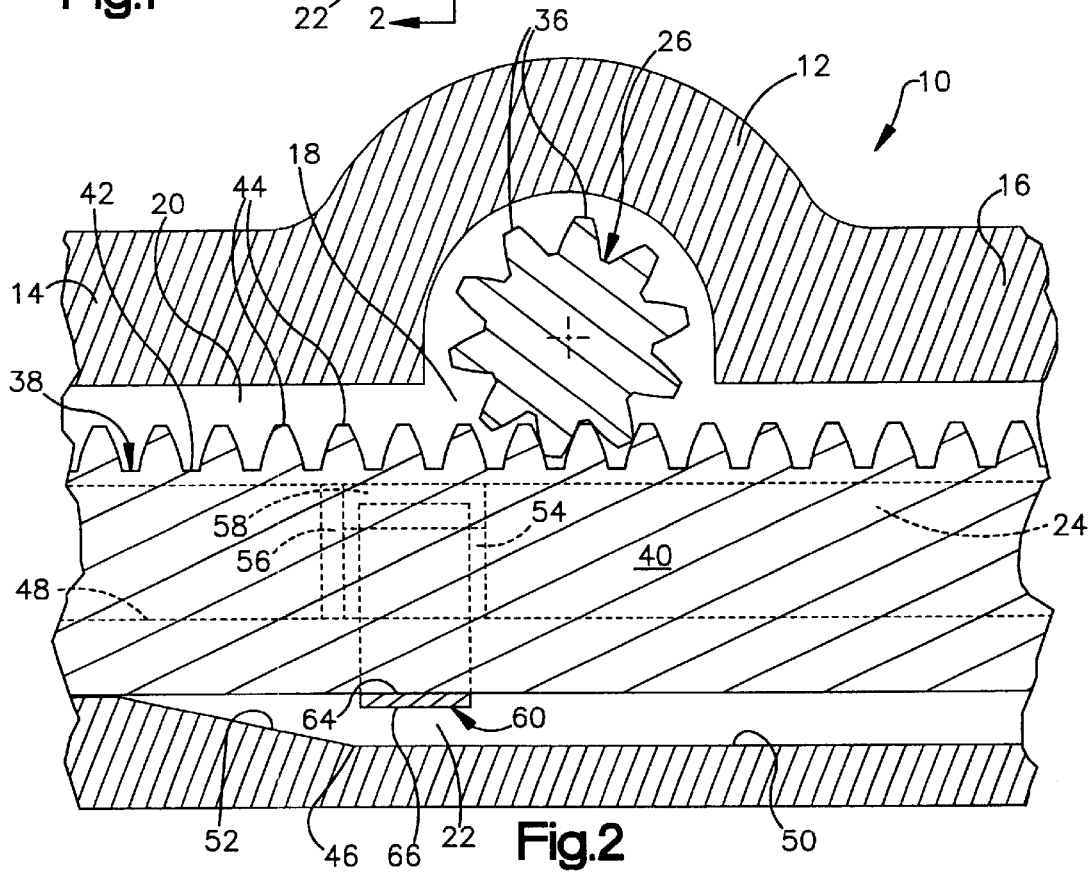
FIG. 2 is a view taken along line 2—2 of FIG. 1.

A portion of a longitudinally extending rack bar 38 is disposed within the main channel 20 of the chamber 18 of the housing 12. The rack bar 38 has opposite end portions (not shown) that are connected to the steerable wheels of the vehicle through tie rods (not shown). The rack bar 38 has a generally cylindrical main body 40. An upper surface 42 of the rack bar 38 has a plurality of teeth 44 (FIG. 2). The plurality of teeth 44 of the rack bar 38 is disposed in meshing engagement with the plurality of teeth 36 of the pinion gear 26. When the pinion gear 26 is rotated, the teeth 36 of the pinion gear 26 mesh with the teeth 44 of the rack bar 38 to cause the rack bar 38 to move linearly through the main channel 20 and relative to the housing 12. As shown in FIG. 1, the cylindrical main body 40 of the rack bar 38 has a radius of curvature that is less than a radius of curvature of the bottom surface 24 of the main channel 20 of the chamber 18.

A relief pocket 22 extends into the bottom surface 24 of the main channel 20. The relief pocket 22 is an integral part of the housing 12 and is cast with the housing 12. As shown in FIG. 1, an opening to the relief pocket 22 is centrally located on the bottom surface 24 of the main channel 20 and divides the bottom surface 24 of the main channel 20 into two equal portions. A bottom surface 46 of the relief pocket 22 has an arcuate shape with a radius of curvature that is greater than the radius of curvature of the main body 40 of the rack bar 38 but is less than the radius of curvature of the bottom surface 24 of the main channel 20. Two edges 48 are formed where the bottom surface 46 of the relief pocket 22 meets the bottom surface 24 of the main channel 20. The two edges 48 extend longitudinally along the length of the relief pocket 22. Since the bottom surface 24 of the main channel 20 is arcuate, the location of the two edges 48 is above the bottom of the main body 40 of the rack bar 38, as shown in FIGS. 1 and 2. Preferably, the two edges 48 extend parallel to one another. The width of the relief pocket 22 between the two edges 48 is greater than the diameter of the cylindrical main body 40 of the rack bar 38. Thus, the bottom of the main body 40 of the rack bar may extend into the relief pocket 22 without becoming lodged between the two edges 48.

As shown in FIG. 2, a flat portion 50 and a tapered portion 52 longitudinally define a bottom surface 46 of the relief pocket 22. The flat portion 50 forms the deepest portion of the relief pocket 22. The flat portion 50 of the bottom surface 46 of the relief pocket 22 extends longitudinally from a second end 16 of the housing 12 under the engagement of the pinion gear 26 and the rack bar 38 and terminates between the engagement of the pinion gear 26 and the rack bar 38 and the first end 14 of the housing 12. The tapered portion 52 of the bottom surface 46 of the relief pocket 22 extends longitudinally from the end of the flat portion 50 toward the first end 14 of the housing 12 and terminates at the bottom surface 24 of the main channel 20 prior to the first end 14 of the housing 12.

A recess 54 (shown by dotted lines in FIG. 2) is machined into the bottom surface 24 of the main channel 20 in a location above the flat portion 50 of the bottom surface 46 of the relief pocket 22 between the tapered portion 52 of the bottom surface 46 of the relief pocket 22 and the engagement of the pinion gear 26 and the rack bar 38. The recess 54 extends longitudinally a short distance and circumferentially along the arc of the bottom surface 24 of the main channel 20 from each edge 48 upward. A short tapered surface 56 (shown by dotted lines in FIG. 2) leads into the recess 54 from the side nearest the first end 14 of the housing 12 to allow access to insert a spring 60 into the recess 54. The recess 54 terminates on each side of the housing 12 in a location near the upper surface 42 of the rack bar 38. As shown in FIG. 1, a lip 58 extends outwardly into the main channel 20 and downwardly over each terminal end of the recess 54.

A spring 60 is disposed in the chamber 18 of the housing 12 for supporting and guiding the rack bar 38. The spring 60 is located in the recess 54 formed in the housing 12. As shown in FIG. 1, opposite ends 62 of the spring 60 extend under the lips 58 formed in the housing 12. The spring 60 is inserted into the housing 12 prior to inserting the rack bar 38. The spring 60 is inserted into the first end 14 of the housing 12 and is inserted into the recess 54 using the short tapered surface 56 accessing the recess 54 on the first end 14 side of the recess 54. The inserted spring 60 is press fit against the housing 12 so that once inserted it will not move out of the recess 54 via the short tapered surface 56.

Preferably, the spring 60 is semi-circular. The spring 60 has an interior surface 64 and an exterior surface 66. The interior surface 64 of the spring 60 is smooth to allow for low friction movement of the rack bar 38 relative to the spring 60. The radius of curvature of the interior surface 64 of the spring 60 is larger than the radius of curvature of the cylindrical main body 40 of the rack bar 38. The radius of curvature of the exterior surface 66 of the spring 60 is larger than the radius of curvature of the interior surface 64 of the spring 60.

The bottom of the cylindrical main body 40 of the rack bar 38 rests on the interior surface 64 of the spring 60. Opposite end portions of the exterior surface 66 of the spring are supported by the bottom surface 24 of the main channel 20 of the housing 12. When placed in the recess 54 of the housing 12, the spring 60 laterally extends across, or bridges, the opening of the relief pocket 22. When extending across the opening of the relief pocket 22, the portion of the spring 60 supporting the rack bar 38 is suspended above the bottom surface 46 of the relief pocket 22, as shown in FIG. 1.

Figure 3A:
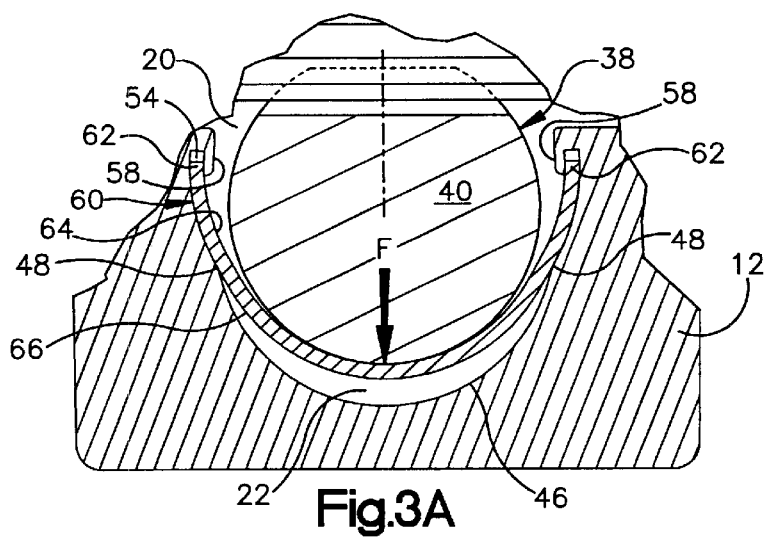
FIGS. 3A–3B are views illustrating the relationship of the rack bar, the spring, and the relief pocket of the present invention under differing load conditions.
Figure 3B:
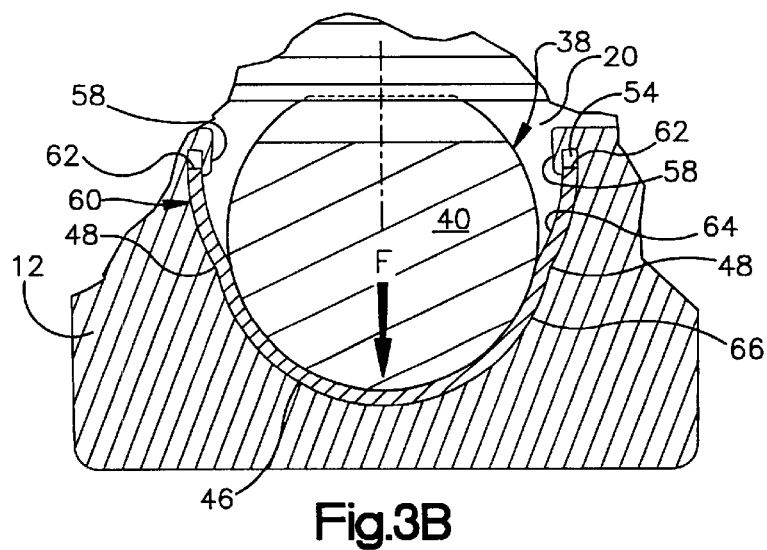

During operation of the vehicle, the rack bar 36 of the rack and pinion steering gear 10 is subjected to varying loads. These loads cause the rack bar 38 to bend. The rack bar 38 of the present invention transfers a portion of these loads to the spring 60. FIGS. 1, 3A, and 3B illustrate the relationship of the rack bar 38, the spring 60, and the relief pocket 22 when subject to different loads. FIG. 1 illustrates the relationship of the rack bar 38, the spring 60, and the relief pocket 22 under normal load conditions. During normal load conditions, there is minimal contact between the rack bar 38 and the spring 60 and the spring 60 is in its highest position relative to the bottom surface 46 of the relief pocket 22. FIG. 3A illustrates the relationship of the rack bar 38, the spring 60, and the relief pocket 22 as the load applied by the rack bar 38 to the spring 60 increases. The load is directed in the direction of the arrow F. As the load applied to the spring 60 increases, the force pushing the spring 60 between the two edges 48 causes the spring 60 to compress. As a result, the spring 60 bends and a larger portion of the circumference of the rack bar 38 makes contact with the interior surface 64 of the spring 60, see FIG. 1 for a comparison. As the spring 60 compresses around the rack bar 38, the radius of curvature of the spring 60 approaches the radius of curvature of the rack bar 38. The decreasing radius of curvature of the spring 60 causes the rack bar 38 to move toward the bottom surface 46 of the relief pocket 22. Thus, as the load increases, the surface area of contact between the rack bar 38 and the spring 60 increases and both the spring 60 and the rack bar 38 move further into the relief pocket 22, i.e., toward the bottom surface 46 of the relief pocket 22.

The curvature of the spring 60 is sized so that it will continue to compress around the rack bar 38 until contacting the bottom surface 46 of the relief pocket 22, as illustrated in FIG. 3B. The spring rate of the spring 60 is dependent upon the material properties and the thickness of the spring 60. Since the spring 60 will have a known spring rate, the depth of the flat portion 50 of the relief pocket 22 can be sized so that the exterior surface 66 of the spring 60 contacts the bottom surface 46 of the relief pocket 22 when a predetermined load condition is reached. The size of the relief pocket 22 and the distance the spring 60 moves is exaggerated in the Figures for purposes of example. In the rack and pinion steering gear 10 of the present invention, the spring 60 moves a maximum distance of 0.4 mm, preferably a distance of 0.1 mm. As the load applied to the spring 60 by the rack bar 38 decreases, the spring 60 will begin to expand, or flatten. The expanding spring 60 will force the rack bar 38 away from the bottom surface 46 of the relief pocket 22.

The tapered portion 52 of the bottom surface 46 of the relief pocket 22 allows the rack bar 38 to bend with the applied loads and not make contact with the bottom surface 24 of the main channel 20 of the chamber 18 of the housing 12. The recess 54 in the housing 12 prevents the spring 60 from moving longitudinally within the housing 12. The lips 58 that extend over the ends 62 of the spring 60 extend downward a distance sufficient to secure the ends 62 of the spring 60 when the spring 60 contacts the bottom surface 46 of the relief pocket 22.

Figure 4:
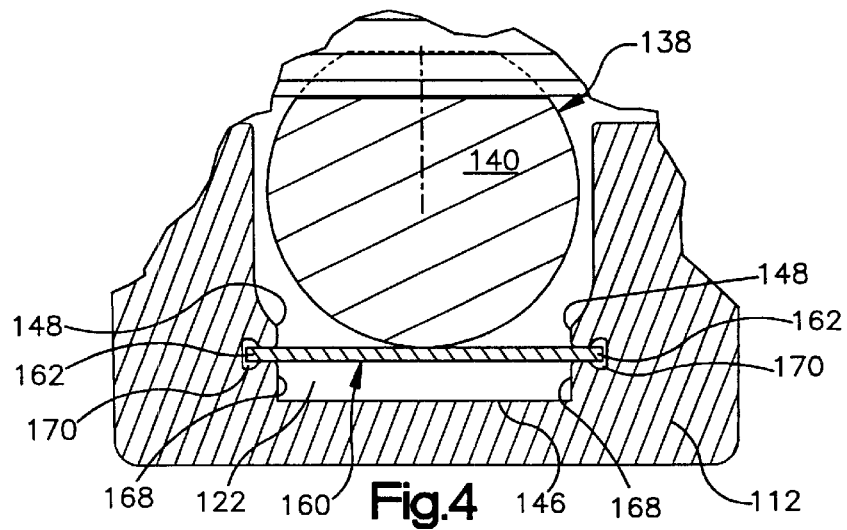
FIG. 4 is a view of a portion of a second embodiment of the rack and pinion steering gear of the present invention.

FIG. 4 shows a portion of a second embodiment of the present invention. In FIG. 4, parts that are similar to those described in the first embodiment will have the same reference numeral increased by 100. As shown in FIG. 4, the bottom surface 146 of the relief pocket 122 is flat and is joined to the two edges 148. by sidewalls 168. Near each edge 148 in the sidewall 168 of the relief pocket 122, a counterbore 170 extends into the housing 112 in a direction tangential to the cylindrical main body 140 of the rack bar 138. On the first end (not shown) of the housing 112, the diameter of the housing 112 is increased to provide access to the counterbores 170 so that the spring 160 may be inserted in the counterbores 170. The spring 160 in the embodiment shown in FIG. 4 is flat and opposite ends 162 of the spring 160 extend into the counterbores 170. As the load on the spring 160 increases, the spring 160 bends and allows the rack bar 138 to extend into the relief pocket 122. The spring 160 will contact the bottom surface 146 of the relief pocket 122 at the predetermined load. When contacting the bottom surface 146 of the relief pocket 122, the ends 162 of the spring 160 will remain within the counterbores 170. As the load decreases, the spring 160 begins to flatten and the ends 162 of the spring 160 will move deeper into the counterbores 170.

Figure 5:
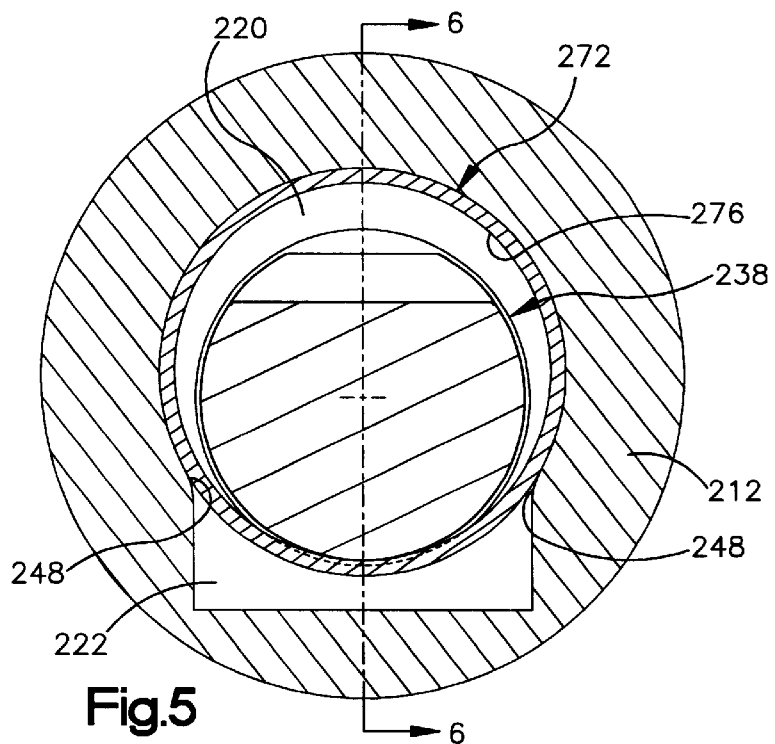
FIG. 5 is a view of a portion of a third embodiment of the rack and pinion steering gear of the present invention.
Figure 6:
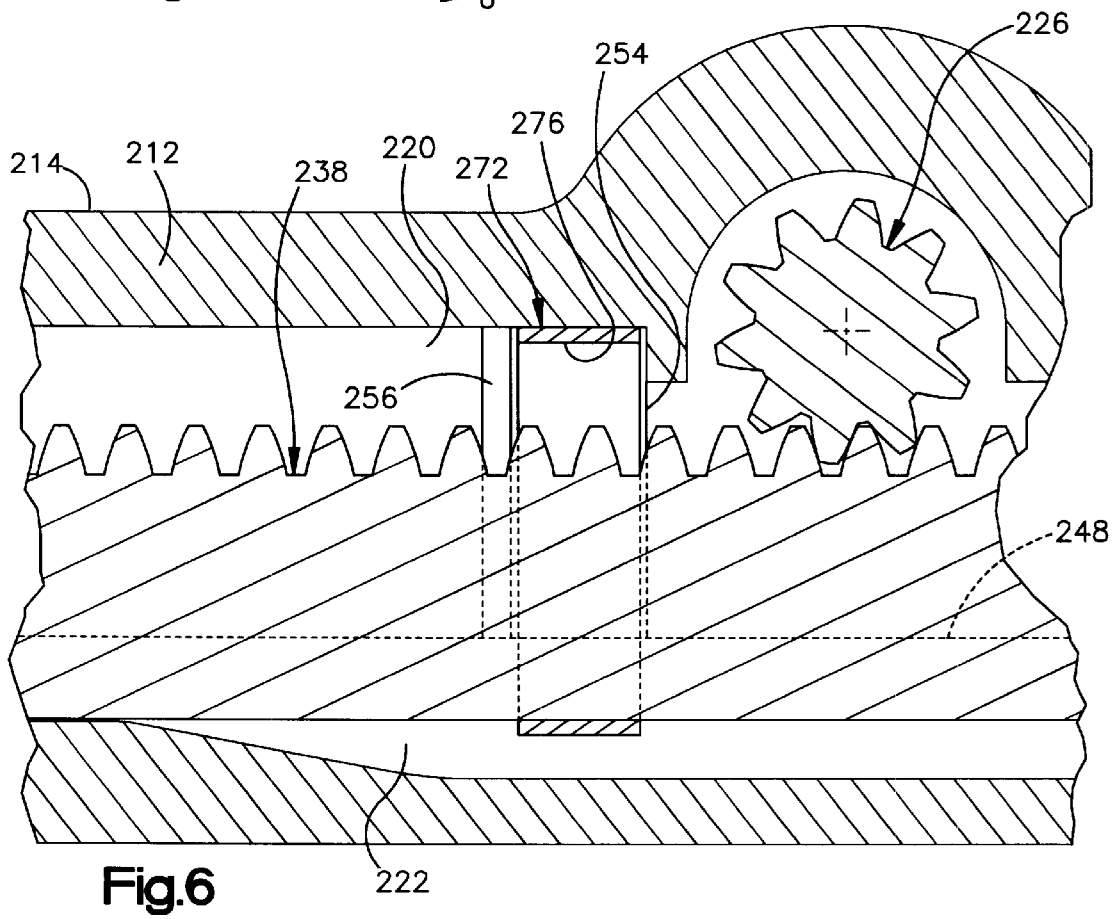
FIG. 6 is a view taken along line 6—6 of FIG. 5.

FIGS. 5 and 6 shows a portion of a third embodiment of the present invention. In FIGS. 5 and 6, parts that are similar to those described in the first embodiment will have the same reference numeral increased by 200. In this embodiment of the invention, the spring 60 has been replaced by a bushing 272. The bushing 272 has a cylindrical main body that is formed from a resilient material such as plastic or metal. The interior surface 276 of the bushing 272 forms an aperture through which the rack bar 238 extends. The bushing 272 has a diameter that is greater than the diameter of the rack bar 238. As shown in FIG. 6, the bushing 272 is located adjacent the engagement of the pinion gear 226 and the rack bar 238. The bushing 272 cannot extend directly under the engagement of the pinion gear 226 and the rack bar 238 because a portion of the bushing 272 would interfere with the engagement of the pinion gear 226 and the rack bar 238. The bushing 272 is located in a recess 254 that extends around the circumference of the main channel 220 of the housing 212. A smooth interior surface 276 of the bushing 272 limits friction between the bushing 272 and the rack bar 238 during movement of the rack bar 238 relative to the bushing 272. In this embodiment of the invention, the diameter of the first end 214 of the housing 212 is increased to allow access for inserting the bushing 272 into the recess 254. A short tapered surface 256 provides access to the recess 254.

The bushing 272 operates in the same manner as the spring 60 in FIGS. 1–3B to support and guide the rack bar 238. As the load on the bushing 272 increases, the bushing 272 becomes elongated and a portion of the bushing 272 begins to move into the relief pocket 222. When the bushing 272 becomes elongated, the bushing 272 will remain in the recess 254 in the housing 212 in at least three locations. The three locations include the side of the housing 212 opposite the relief pocket 222 and the two edges 248 where the relief pocket 222 meets the bottom surface of the main channel 220 of the housing 212.

From the above description of the invention, those skilled in the art will perceive improvements, changes and modifications. Such improvements, changes and modifications within the skill of the art are intended to be covered by the appended claims.

Having described the invention, the following is claimed:

1. A rack and pinion steering gear comprising:
   a housing having a chamber, a portion of the chamber being a relief pocket;
   a pinion gear rotatably mounted in the chamber of the housing;
   a rack bar movable relative to the pinion gear, the track bar being at least partially disposed in the chamber of the housing and having teeth in meshing engagement with the pinion gear; and
   a flat spring disposed in the chamber of the housing for supporting and guiding movement of the rack bar relative to the pinion gear,
   the spring extending across an opening to the relief pocket, the spring extending into the relief pocket as a load applied to the spring from the rack bar increases.

2. A rack and pinion steering gear comprising:
   a housing having a chamber, a portion of the chamber being a relief pocket;
   a pinion gear rotatably mounted in the chamber of the housing;
   a rack bar movable relative to the pinion gear, the rack bar being at least partially disposed in the chamber of the housing and having teeth in meshing engagement with the pinion gear; and
   a spring disposed in the chamber of the housing for supporting and guiding movement of the rack bar relative to the pinion gear,
   the spring extending across an opening to the relief pocket, the spring extending into the relief pocket as a load applied to the spring from the rack bar increases,
   the relief pocket having a bottom surface, the spring contacting the bottom surface of the relief pocket when load conditions applied to the spring from the rack bar reach a predetermined level, the spring being spaced apart from the bottom surface when the load conditions do not reach the predetermined level.

3. A rack and pinion steering gear comprising:
   a housing having a chamber, a portion of the chamber being a relief pocket;
   a pinion gear rotatably mounted in the chamber of the housing;
   a rack bar movable relative to the pinion gear, the rack bar being at least partially disposed in the chamber of the housing and having teeth in meshing engagement with the pinion gear; and
   a spring disposed in the chamber of the housing for supporting and guiding movement of the rack bar relative to the pinion gear,
   the spring extending across an opening to the relief pocket, the spring extending into the relief pocket as a load applied to the spring from the rack bar increases,
   the spring being a cylindrical bushing that surrounds the rack bar in a position in the chamber of the housing adjacent the engagement of the pinion gear and the rack bar.

4. The rack and pinion steering gear of claim 3 further being defined by:
   the bushing having a diameter that is greater than a diameter of the rack bar.

5. The rack and pinion steering gear of claim 3 further being defined by:
   the bushing having a smooth interior surface for limiting friction between the bushing and the rack bar during movement of the rack bar.

* * * * *

UNITED STATES PATENT AND TRADEMARK OFFICE
CERTIFICATE OF CORRECTION

PATENT NO.    : 6,427,552 B1
DATED         : August 6, 2001
INVENTOR(S)   : Paul R. Sahr It is certified that error appears in the above-identified patent and that said Letters Patent is hereby corrected as shown below:

<u>Column 5,</u>
Line 61, change "track" to -- rack --.

Signed and Sealed this

Twenty-fifth Day of February, 2003

JAMES E. ROGAN
*Director of the United States Patent and Trademark Office*